3,091,541
METHOD FOR MAKING WATER-SOLUBLE SHEET FILM
Martin E. Rowley, Rochester, N.Y., assignor to Eastman Kodak Company, Rochester, N.Y., a corporation of New Jersey
No Drawing. Filed July 12, 1961, Ser. No. 123,440
6 Claims. (Cl. 106—187)

This invention relates to compositions of matter in which water-soluble cellulose derivatives, such as cellulose acylate alkali metal sulfates and cellulose alkyl ether alkali metal sulfates, are combined or mixed with a solvent mixture, with or without a compatible plasticizer, and with or without other useful addition agents, and to products produced from such compositions.

As is well known, cellulose derivative sheets or films are commonly produced by dissolving a cellulose derivative in a suitable solvent or solvent mixture and depositing the solution or dope in the form of a film on a smooth surface, causing the film to set up by evaporation of the solvent, and stripping the film therefrom. The general practice has been to employ a clear solution or dope to produce clear films, since the resulting film formed from a solution is much the same in appearance as the solution, or even inferior. A clear solution of cellulose acylate sodium sulfates or cellulose alkyl sodium sulfates requires 40 to 60 parts of water and an organic solvent, such as methanol in the solvent mixture. Such a large content of water in the solvent mixture tends to cause extremely slow coating. However, cellulose acylate sodium sulfate and cellulose alkyl ether sodium sulfate may be cast from opaque solutions containing much smaller amounts of water than previously believed necessary to produce transparent film.

One object of this invention is to produce compositions of matter from which may be manufactured transparent films of water-soluble cellulose acylate sodium sulfates. Another object of my invention is to produce compositions of matter from which may be manufactured transparent, water-soluble films of cellulose alkyl ether sodium sulfates. Other objects of my invention will appear herein.

I have found that solutions comprising cellulose acylate sodium sulfate or cellulose alkyl ether sodium sulfate in a solvent mixture comprising 2–30 percent water and 98–70 percent of organic solvent, are capable of producing transparent, water-soluble films upon evaporation of the solvent from a layer of solution.

My invention will be further illustrated by the following examples. Example I shows the casting of a transparent film of cellulose acetate sodium sulfate from an opaque solution of cellulose acetate sodium sulfate in a mixture of water and methanol.

Example I

A mixture of 510 parts of methanol and 90 parts of water was added to 150 parts of sodium cellulose acetate sulfate containing 8.6 percent sulfur, 22.6 percent acetyl and having an intrinsic viscosity of 1.11 (in sodium iron tartrate solution containing 6% free sodium hydroxide). The solution was warmed to 120° F. to aid in the solution. After the ester was essentially all dissolved, 100 parts of acetone was added, along with 34 parts of glycerol as a plasticizer. The milky appearing, opaque mixture was stirred until a completely smooth solution resulted and this was filtered, under pressure, through felt.

Coating was accomplished by spreading a uniform layer of the solution on a smooth surface which was kept at 115° F. (about 20° F. below the boiling point of the lowest boiling solvent, in this case acetone). A current of warm air was then applied at the surface of the coated solution to cause evaporation of the solvents with subsequent setting of the film. The temperature of the air was between 150–160° F. After about 3–4 minutes of drying time on the coating surface, the film was stripped and dried to remove the last traces of solvent. The film was clear and readily water-soluble. The film was useful as a packaging agent for materials which are to be added to water-containing systems.

The casting of a transparent film of cellulose alkyl ether sodium sulfate from a solution of the cellulose derivative in water, methylene chloride and methanol is shown in Example II.

Example II

To a mixture of 150 parts of methanol, 150 parts of methylene chloride, 50 parts of water and 20 parts of 1,2,6-hexanetriol (plasticizer) was added 80 parts of sodium ethyl-cellulose sulfate containing approximately 3% combined sulfur. The milky, opaque dope was stirred until completely smooth and then was filtered.

Coating was again accomplished by spreading a uniform layer of the solution on a smooth surface which was at room temperature. A current of air was applied at the surface to cause evaporation of the solvents, to give a clear film which stripped easily. The film was very flexible, had good tear strength and was readily water soluble.

The solvent system which I employ comprises 2–30 percent water and 98–70 percent of an organic solvent or organic solvent mixture. Preferably, the solvent system comprises 5–20 percent water and 95–80 percent of organic solvent. In general, organic solvents having a boiling point less than about 150°–160° F. are useful. Examples of suitable organic solvents include acetone, methylene chloride, the lower aliphatic alcohols such as methanol and ethanol, or a mixture of these solvents. If desired, various plasticizers, such as glycerol may be incorporated in the solvent mixture. The viscosity of the coating solution may be regulated by the percent of solids therein, and by the temperature of the solution at the time of coating, in order to obtain optimum results.

The water-soluble derivative films which may be prepared in accordance with my invention include the cellulose acylate alkali metal sulfates and the cellulose alkyl ether alkali metal sulfates. Both the acyl group and the alkyl group may contain 1–4 carbon atoms. The cellulose derivative may have mixed acyl groups, mixed alkyl groups, or a mixture of alkyl and acyl groups. For economic reasons, the preferred alkali metal is sodium. The water-soluble cellulose acylate sulfates may be prepared by any convenient method, for example, that disclosed by C. L. Crane in U.S. Patent 2,582,009, issued January 8, 1952. The cellulose alkyl ether alkali metal sulfates may be prepared in accordance with the method described by myself and Gordon Hiatt in U.S. patent application Serial No. 56,347, filed September 16, 1960.

The films prepared in accordance with my invention are useful in packaging a wide variety of materials, and are especially useful in packaging materials which are to be added to water-containing systems.

Although the invention has been described in considerable detail with reference to certain preferred embodiments thereof, it will be understood that variations and modifications can be effected within the spirit and scope of the invention as described hereinabove and as defined in the appended claims.

I claim:

1. A flowable film-forming solution essentially consisting of a water soluble cellulose derivative selected from the group consisting of cellulose acylate alkali metal sulfates and cellulose alkyl ether alkali metal sulfates, the acyl and alkyl groups of which contain 1–4 carbon atoms, and a solvent mixture essentially consisting of 2–30% water and 98–70% of an organic solvent selected from the group consisting of lower aliphatic alcohols containing 1–4 carbon atoms, methylene chloride, acetone and their mixtures, capable of producing a transparent, water-soluble film upon evaporation of the solvent from a layer of the solution.

2. A flowable film-forming solution essentially consisting of a water soluble cellulose acylate alkali metal sulfate, the acyl groups of which contain 1–4 carbon atoms, and a solvent mixture essentially consisting of 5–20% water and 95–80% of an organic solvent selected from the group consisting of lower aliphatic alcohols containing 1–4 carbon atoms, methylene chloride, acetone and their mixtures, capable of producing a transparent, water-soluble film upon evaporation of the solvent from a thin layer of the solution.

3. A flowable film-forming solution essentially consisting of a water soluble cellulose alkyl ether alkali metal sulfate, the alkyl groups of which contain 1–4 carbon atoms, and a solvent mixture essentially consisting of 5–20% water and 95–80% of an organic solvent selected from the group consisting of lower aliphatic alcohols containing 1–4 carbon atoms, methylene chloride, acetone and their mixtures, capable of producing a transparent water-soluble film upon evaporation of a solvent from a thin layer of the solution.

4. The method of producing a transparent, water-soluble film which comprises casting a layer of a solution essentially consisting of a water soluble cellulose derivative selected from the group consisting of cellulose acylate alkali metal sulfates and cellulose alkyl ether alkali metal sulfates, the acyl and alkyl groups of which contain 1–4 carbon atoms, and a solvent mixture essentially consisting of 2–30% water and 98–70% of an organic solvent selected from the group consisting of lower aliphatic alcohols containing 1–4 carbon atoms, methylene chloride, acetone and their mixtures, onto a smooth film-forming surface, evaporating the solvent from the layer of said solution, and stripping the film from said surface.

5. Claim 1 wherein cellulose derivative is cellulose acetate sulfate, alkali metal salt.

6. Claim 1 wherein cellulose derivative is ethyl cellulose sulfate, alkali metal salt.

References Cited in the file of this patent

UNITED STATES PATENTS

| | | |
|---|---|---|
| 2,739,069 | Fordyce et al. | Mar. 20, 1956 |
| 2,969,355 | Maln | Jan. 24, 1961 |
| 2,969,356 | Tovey | Jan. 24, 1961 |